US007707986B1

(12) United States Patent
Plaxton

(10) Patent No.: US 7,707,986 B1
(45) Date of Patent: May 4, 2010

(54) NOISE ATTENUATION FOR INTERNAL COMBUSTION ENGINE

(75) Inventor: Sheldon K Plaxton, Highland, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 1 day.

(21) Appl. No.: 12/251,692

(22) Filed: Oct. 15, 2008

(51) Int. Cl.
F02M 35/10 (2006.01)
(52) U.S. Cl. .................. 123/184.53; 181/224; 181/229
(58) Field of Classification Search ............ 123/184.53, 123/184.61; 181/224, 229, 270; 251/118, 251/127, 305
See application file for complete search history.

(56) References Cited

U.S. PATENT DOCUMENTS

| 1,305,174 | A | 5/1919 | Smith |
|---|---|---|---|
| 1,865,677 | A | 7/1932 | Cheyney |
| 2,030,391 | A | 2/1936 | Ott |
| 2,430,841 | A | 11/1947 | Wulfhorst |
| 2,639,230 | A | 5/1953 | Lefebre |
| 2,704,504 | A | 3/1955 | Wilkening |
| 2,721,791 | A | 10/1955 | Linn |
| 2,942,683 | A | 6/1960 | Moyer |
| 3,120,876 | A | 2/1964 | Lirette |
| 3,238,955 | A | 3/1966 | Lassiter |
| 3,265,372 | A | 8/1966 | Bradley |
| 3,454,128 | A | 7/1969 | Nopper |
| 3,458,297 | A | 7/1969 | Anderson |
| 3,544,290 | A | 12/1970 | Larson |
| 3,895,686 | A | 7/1975 | Savkar et al. |
| 3,960,177 | A | 6/1976 | Baumann |
| 3,965,873 | A | 6/1976 | Konomi et al. |
| 4,094,290 | A | 6/1978 | Dismuke |
| 4,127,183 | A | 11/1978 | McLarty |
| 4,137,886 | A | 2/1979 | Hiramatsu |
| 4,274,386 | A | 6/1981 | Reyes |
| 4,303,144 | A | 12/1981 | Wirt |

(Continued)

FOREIGN PATENT DOCUMENTS

CA 971446 7/1975

(Continued)

OTHER PUBLICATIONS

Nakase et al, Flow Noise Reduction Upon Quick Opening the Throttle, SAE Technical Paper Series, 2001-01-1429, Apr. 30-May 3, 2001, Traverse City, MI.

(Continued)

Primary Examiner—Noah Kamen
(74) Attorney, Agent, or Firm—Reising Ethington P.C.

(57) ABSTRACT

A component, such as an intake manifold or a throttle body, has an air passage. A structure may extend into the air passage so that the structure intersects a part of a total air-flow passing through the air passage. The structure may have a first through-hole and a second through-hole. Each of the through-holes define a cross-sectional area that may tapers in a direction of air-flow that is passing through the air passage so that a cross-sectional area of an entrance of the respective through-hole is greater than a cross-sectional area of an exit of the respective through-hole. The structure helps attenuate acoustic noise that may occur in the component due to the air-flow.

21 Claims, 3 Drawing Sheets

U.S. PATENT DOCUMENTS

| | | | |
|---|---|---|---|
| 4,333,441 A | 6/1982 | Still et al. | |
| 4,463,742 A | 8/1984 | Williams | |
| 4,492,212 A | 1/1985 | Dooley | |
| 4,672,940 A | 6/1987 | Nakayama et al. | |
| 4,691,894 A | 9/1987 | Pyotsia et al. | |
| 4,712,523 A | 12/1987 | Matsubayashi | |
| 4,782,912 A | 11/1988 | Wandless | |
| 4,936,413 A | 6/1990 | Lee | |
| 5,010,862 A | 4/1991 | Hashimoto et al. | |
| 5,113,838 A | 5/1992 | Kim | |
| 5,332,872 A | 7/1994 | Ewanek | |
| 5,465,756 A | 11/1995 | Royalty et al. | |
| 5,571,242 A | 11/1996 | Demorest | |
| 5,663,536 A | 9/1997 | Kaplan | |
| 5,714,724 A | 2/1998 | Menzel | |
| 5,722,357 A | 3/1998 | Choi | |
| 5,962,820 A | 10/1999 | LePoutre | |
| 6,024,125 A * | 2/2000 | Baumann | 137/625.32 |
| 6,824,119 B2 | 11/2004 | Conley et al. | |

FOREIGN PATENT DOCUMENTS

| | | | |
|---|---|---|---|
| DE | 3226453 A1 | 1/1984 | |
| DE | 3720380 A1 | 12/1987 | |
| DE | 3819728 A1 | 1/1989 | |
| DE | 29511979 U1 | 9/1995 | |
| EP | 0365892 A1 | 5/1990 | |
| FR | 1213642 | 4/1960 | |
| FR | 2257793 | 8/1975 | |
| JP | 57070912 | 5/1982 | |
| JP | 57091316 | 6/1982 | |
| JP | 61049134 | 3/1986 | |
| JP | 63306268 | 12/1988 | |
| JP | 8128367 | 5/1996 | |
| JP | 10246130 | 9/1998 | |
| JP | 2001098959 | 4/2001 | |

OTHER PUBLICATIONS

Nishio et al, New Approach to Low-Noise Air Intake System Development, 911042, pp. 25-37.

Miyaji, Air Intake Device for Internal Combustion Engine, Toyota Kokai Gazette, Apr. 26, 1996, IPC F 02 M, Publication No. 6118, four pages.

* cited by examiner

US 7,707,986 B1

NOISE ATTENUATION FOR INTERNAL COMBUSTION ENGINE

TECHNICAL FIELD

The field to which the disclosure generally relates includes internal combustion engines and ways to attenuate acoustic noises in internal combustion engines caused by air-flow.

BACKGROUND

In a fuel-injected internal combustion automobile engine, a throttle body and an intake manifold are used to guide air toward combustion chambers of the engine. A throttle valve in the throttle body is typically rotated open to let air into the intake manifold by suction caused by the combustion chambers. In some cases, a so-called air-rush noise and other noises may be heard outside of the engine, such as with sudden opening of the throttle valve, when the throttle valve is held partially open, and other instances of high suction. Such noise can also occur in engines with forced air induction, such as caused by turbochargers and superchargers.

SUMMARY OF EXEMPLARY EMBODIMENTS OF THE INVENTION

One exemplary embodiment includes a product which may include a component of an internal combustion engine and a structure. The component may be an intake manifold or a throttle body, for example. The component may have an air passage. The structure may extend into the air passage. The structure may have a first through-hole and a second through-hole. Each through-hole may define a cross-sectional area being tapered in a direction of air-flow traveling through the air passage. In this way, a cross-sectional area of an entrance of the respective through-hole is greater in value than a cross-sectional area of an exit of the respective through-hole. The structure may intersect a part of the total air-flow and may help attenuate acoustic noises in the component caused by the air-flow.

Another exemplary embodiment includes a product which may include a structure to help attenuate acoustic noise in an internal combustion engine. The structure may be used in an air passage of an intake manifold or may be used in an air passage of a throttle body, for example. The structure may have a first through-hole, a second through-hole, and a third through-hole. The first through-hole may lie along a part of a first imaginary circumference. The first through-hole may have a first top wall and a first bottom wall. The first top wall may be slanted toward the first bottom wall from an entrance of the first through-hole to an exit of the first through-hole. The first bottom wall may be slanted toward the first top wall from the entrance to the exit. The second through-hole may lie along a part of the first imaginary circumference and may be circumferentially offset, or spaced from, the first through-hole. The second through-hole may be separated from the first through-hole by a lateral connector. The second through-hole may have a second top wall and a second bottom wall. The second top wall may be slanted toward the second bottom wall from an entrance of the second through-hole to an exit of the second through-hole. The second bottom wall may be slanted toward the second top wall from the entrance to the exit. The third through-hole may lie along a part of a second imaginary circumference that may be radially offset, or spaced from, the first imaginary circumference. The third through-hole may be separated from the first and second through-holes by a longitudinal connector. The third through-hole may have a third top wall and a third bottom wall. The third top wall and the third bottom wall may be generally parallel with a general direction of air-flow.

Another exemplary embodiment includes a product which may include an intake manifold and a structure. The intake manifold may have an air passage defined by an air passage wall. The structure may extend from a portion of the air passage wall and into the air passage so that the structure intersects a part of a total air-flow traveling through the air passage. The structure may help attenuate acoustic noise in the intake manifold that may be caused by the air-flow. The structure may include a first through-hole, a second through-hole, a third through-hole, a fourth through-hole, and a fifth through-hole. The first through-hole may lie along a part of a first imaginary circumference and may define a tapering cross-sectional area. The second through-hole may also lie along a part of the first imaginary circumference and may define a tapering cross-sectional area. The third through-hole may also lie along a part of the first imaginary circumference and may define a tapering cross-sectional area. The fourth through-hole may lie along a part of a second imaginary circumference that may be radially offset, or spaced from, the first imaginary circumference. The fourth through-hole may define a uniform cross-sectional area. The fifth through-hole may also lie along a part of the second imaginary circumference and may define a uniform cross-sectional area.

Another exemplary embodiment includes a method which may include providing a component, such as an intake manifold or a throttle body, of an internal combustion engine having an air passage defined by an air passage wall. The method may also include providing a structure that may extend from the air passage wall. The structure may have a first and a second arcuate shaped through-hole, each through-hole may have a tapered cross-section. And the method may include funneling air-flow through the first and second through-holes to attenuate noise in the component that may be caused by the air-flow.

Another exemplary embodiment includes a product which may include an intake manifold and a structure. The intake manifold may have an air passage defined by an air passage wall. The structure may extend into the air passage and may have one or more arcuate shaped slots lying along an imaginary circumference. The structure may attenuate acoustic noise in the intake manifold caused by air-flow.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

The figures illustrate an exemplary embodiment of a structure 10 designed to attenuate acoustic noise, such as air-rush and whistling noises, caused by air-flow through an intake manifold 12 or a throttle body 13 of an internal combustion engine. Such noises may occur at transient and steady-state conditions like sudden engine acceleration, constant engine speed, and other instances of metering air-flow to the engine. The air-flow may result from suction by the combustion chambers or by forced air induction from a turbocharger or a supercharger, for example. The noise attenuation structure 10 may, in certain embodiments, minimally affect qualities of the air-flow such as velocity and pressure drop, while maintaining its stiffness and structural integrity. As an aside, and as used herein, the terms axially, radially, and circumferentially refer to directions relative to the generally cylindrical shape of an air passage of the intake manifold, so that the radial direction extends generally along any one of the imaginary radii of the cylindrical shape, the axial direction is generally parallel to a center axis of the cylindrical shape, and the circumferential direction extends generally along any one of the imaginary circumferences of the cylindrical shape.

Figure 1:
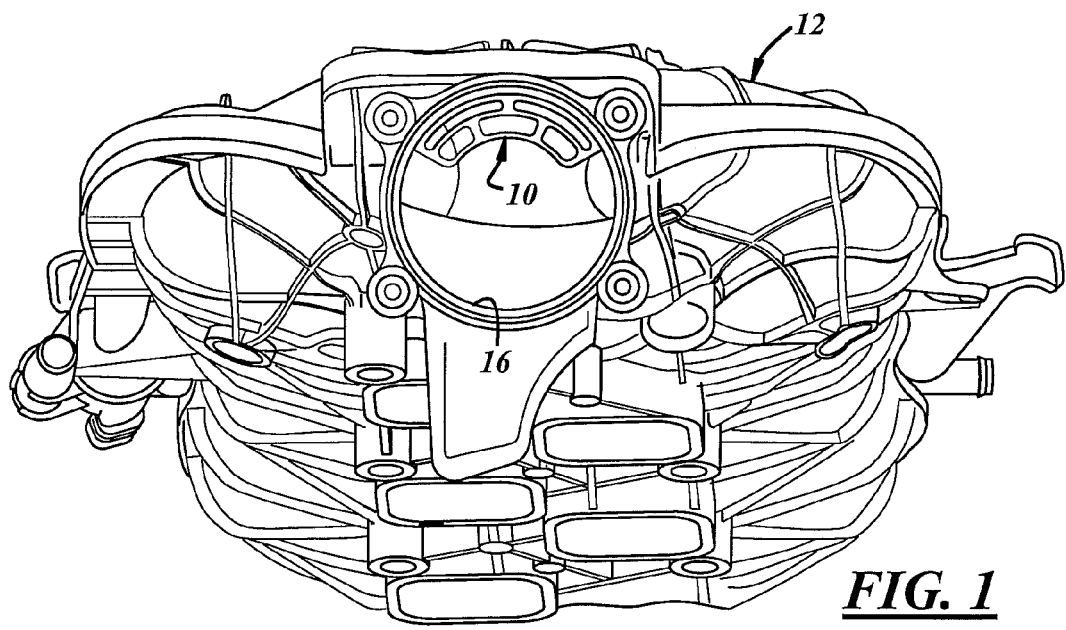
FIG. 1 is a perspective view of an exemplary embodiment of an intake manifold.
Figure 2:
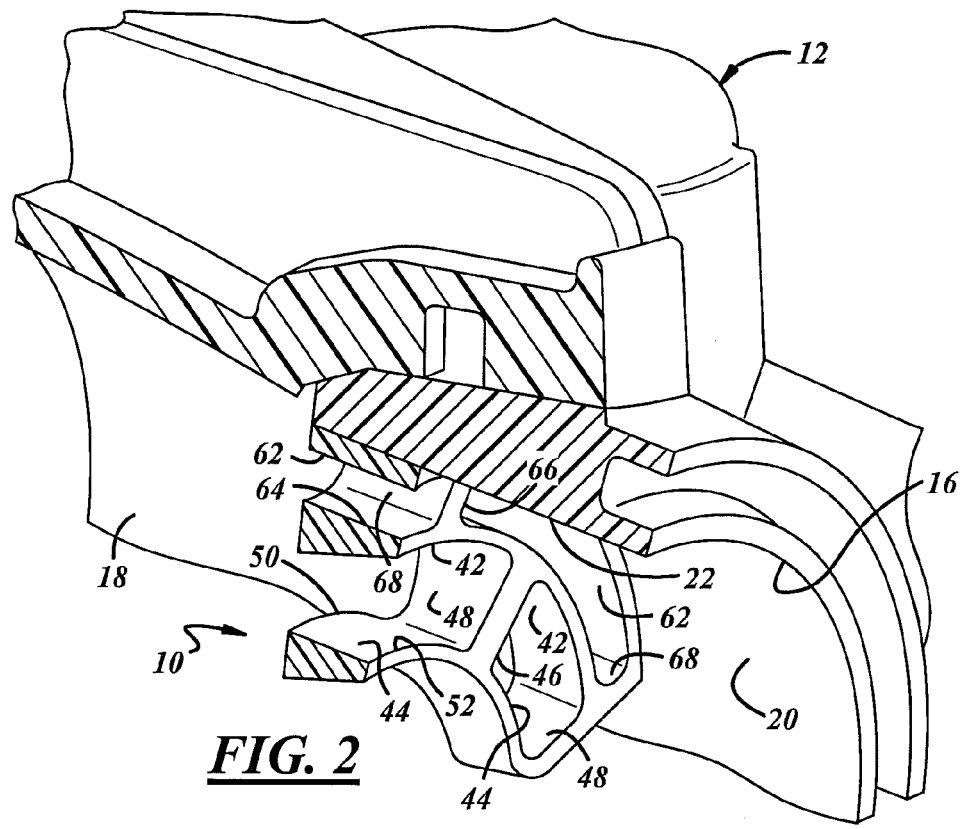
FIG. 2 is a sectioned perspective view of an exemplary embodiment of a noise attenuation structure that may be used in the intake manifold of FIG. 1.
Figure 4:
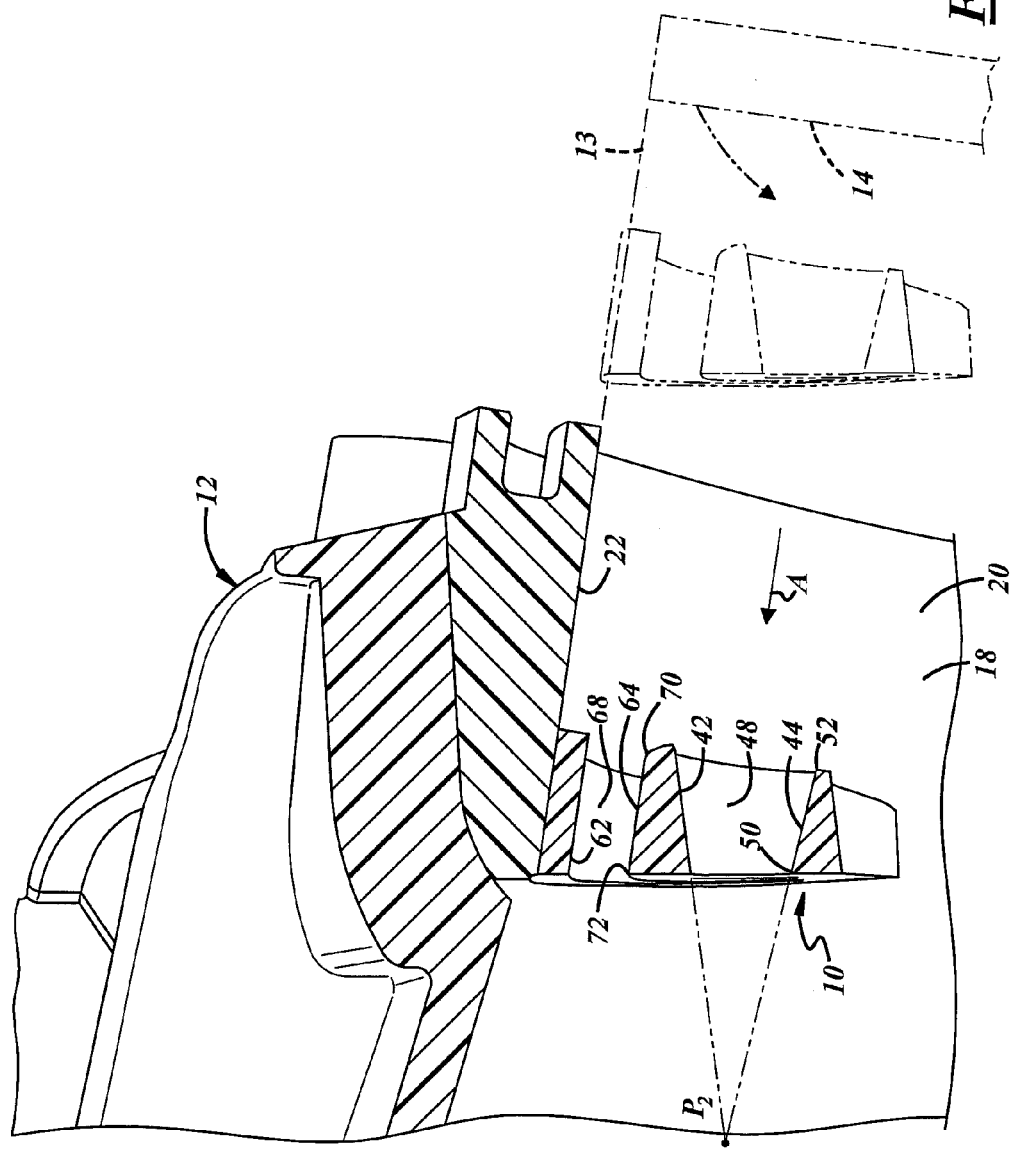
FIG. 4 is a sectioned side view of the noise attenuation structure of FIG. 2.

The intake manifold 12 may guide air downstream a throttle valve 14 (shown in phantom in FIG. 4) to one or more combustion chambers of the engine. The engine may be equipped with a fuel injection system that injects fuel directly into the combustion chambers so that the throttle body 13 and the intake manifold 12 guide only air to the combustion chambers. Referring to FIGS. 1 and 2, the intake manifold 12 may have an air inlet 16 that connects and seals with the throttle body 13 and that initially receives air from the throttle body. The air inlet 16 leads to an air passage 18 bounded by an air passage wall 20. The intake manifold 12 may also have an air plenum compartment communicating with the combustion chambers. In one exemplary embodiment, all or a portion of the intake manifold 12 may be made by a molding process out of a composite material like a polymer such as, but not limited to, Nylon-6. Of course, other suitable manufacturing processes and materials may be used. Furthermore, other constructions and arrangements of the intake manifold are possible that have not been shown or described. For example, intake manifolds having different shapes and geometries are possible including those with different diameters, blanks, air plenum volumes, and the like as may be required for different engines. Referring to FIG. 4, the throttle body 13 may house the throttle valve 14.

The noise attenuation structure 10 helps suppress and reduce acoustic noises caused by the air-flow in the intake manifold 12 and/or in the throttle body 13. The noise attenuation structure 10 may be made as one-piece with the intake manifold 12 or with the throttle body 13, and thus may be formed in the same manufacturing process thereof, or the noise attenuation structure may be made as a separate piece that is subsequently attached to the intake manifold or the throttle body. Like the intake manifold 12, the noise attenuation structure 10 may be made out of a composite material like a polymer such as, but not limited to, Nylon-6 or any other suitable material. The noise attenuation structure 10 may be located downstream the throttle valve 14 and slightly inboard of the air inlet 16 as shown in FIG. 4, may be located in the throttle body 13 downstream the throttle valve 14 as shown in phantom in FIG. 4, may be located on a face of the throttle valve, and may be located downstream the air plenum compartment slightly upstream an inlet of the combustion chambers. In the latter case, one noise attenuation structure 10 may be located at each combustion chamber. Of course, other locations are possible.

Figure 3:
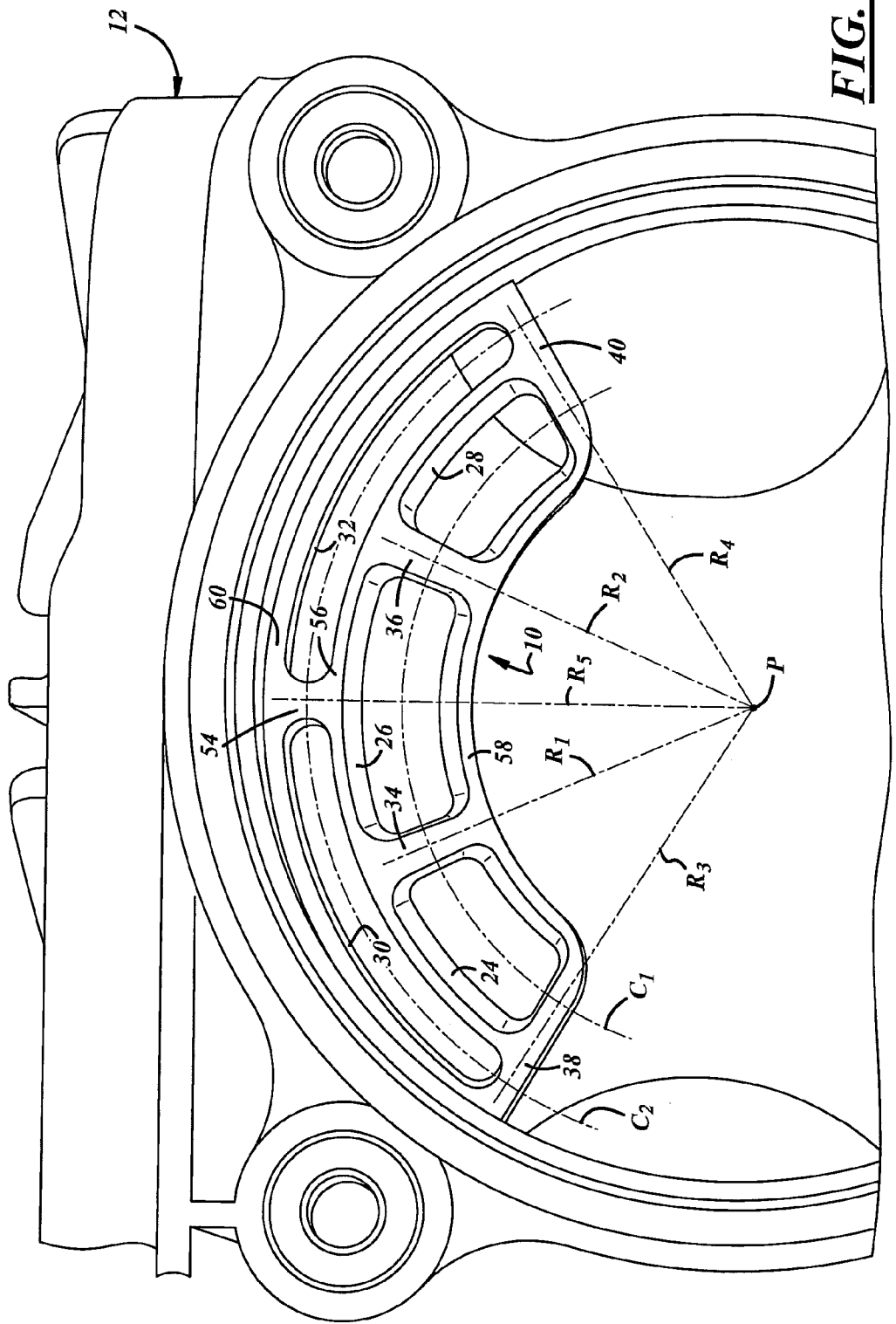
FIG. 3 is a front view of the noise attenuation structure of FIG. 2.

Referring to FIGS. 2 and 3 and taking the intake manifold location as the example in one embodiment, the noise attenuation structure 10 may extend radially from a portion of the air passage wall 20 and into the air passage 18 such that the noise attenuation structure intersects only a part of the total air-flow traveling through the air passage. For example, the noise attenuation structure 10 may extend from an upper portion 22 of the air passage wall 20. The noise attenuation structure 10 may protrude into the air passage 18 a set distance which is less than a measured radius of the air passage. Circumferentially, the noise attenuation structure 10 may span about one-third of a total measured circumference of the air passage wall 20, or 120° out of a total 360°. And axially, the noise attenuation structure 10 may have a length ranging from about 2 to about 11 millimeters, and in one embodiment of about 5 millimeters. In one exemplary embodiment, the noise attenuation structure 10 may have a first slot or through-hole 24, a second slot or through-hole 26, a third slot or through-hole 28, a fourth slot or through-hole 30, and a fifth slot or through-hole 32.

In select embodiments, the noise attenuation structure 10 may include a first arcuate shaped slot or through-hole and a second arcuate shaped slot or through-hole. Here, the first and second through-holes may lie along a common imaginary circumference generally through the center of the through-holes. In another embodiment, the first and second arcuate shaped through-holes may be concentrically positioned, being formed along radii having a common centerpoint. In yet another embodiment, the noise attenuation structure may include a number of concentric tapered arcuate shaped slots or through-holes, where the noise attenuation structure extends across the entire diameter of the air passage in which the structure is located.

Referring to FIG. 3, the first, second, and third through-holes 24, 26, 28 may each lie along a part of a first imaginary circumference $C_1$ that may be concentric with an imaginary circumference of the air passage 18. Each through-hole may be circumferentially offset and separated from a neighboring through-hole by a lateral connector. For example, a first lateral connector 34 may separate the first and second through-hole 24, 26, and a second lateral connector 36 may separate the second and third through-hole 26, 28. The first and second lateral connectors 34, 36 may be angled toward a centerpoint P of the air passage 18, whereby the first lateral connector 34 lies along a first imaginary radial line $R_1$ and the second lateral connector 36 lies along a second imaginary radial line $R_2$. The first and second imaginary radial lines $R_1$, $R_2$ may converge at the centerpoint P. Likewise, a pair of outer lateral connectors 38, 40 may lie along a third imaginary radial line $R_3$ and a fourth imaginary radial line $R_4$, respectively, that are angled toward the centerpoint P. The different lateral connectors need not be equally spaced with respect to each other.

Each of the first, second, and third through-holes 24, 26, 28 may have similar elongated oval shapes bent along the first imaginary circumference $C_1$. Referring to FIGS. 2 and 4, each of the through-holes may have a top wall 42, a bottom wall 44, a first side wall 46, and a second side wall 48. The top and bottom walls 42, 44 may be slanted toward each other and, when extended by imaginary line, may converge at a point $P_2$ located downstream an exit 50 of the through-holes. Put another way, the through-holes may taper or grow narrower in cross-sectional area from an entrance 52 to the exit 50. A cross-sectional area measured at the entrance 52 may have a greater value than a cross-sectional area measured at the exit 50. The cross-sectional area may taper continuously in a general direction of air-flow A from the entrance 52 to the exit 50.

In different embodiments, the top and bottom walls 42, 44 may be slanted at similar angles with respect to each other, may be slanted at different angles with respect to each other, and may be slanted at different angles than shown in the figures. Still in other embodiments, the top and bottom walls 42, 44 need not be continuously tapered from the entrance 52 to the exit 50, and instead a portion between the entrance and the exit may be uniform in diameter for a set distance, for example. The first and second side walls 46 and 48 may be generally parallel and aligned with the direction of air-flow A. When manufactured by a molding process, the first and second side walls 46, 48 may be slightly slanted toward each other to provide a suitable amount of draft for removing the part out of a molding die.

Referring to FIG. 3, the fourth and fifth through-holes 30, 32 may be radially offset from the first, second, and third through-holes 24, 26, 28, and may each lie along a part of a second imaginary circumference $C_2$ that may be concentric with the imaginary circumference of the air passage 18. The fourth and fifth through-holes 30, 32 may be circumferentially offset and separated from one another by a third lateral connector 54 that may lie along a fifth imaginary radial line $R_5$. The fourth and fifth through-holes 30, 32 may be separated from the first, second, and third through-holes 24, 26, 28 by a first longitudinal connector 56 that may be concentric with the imaginary circumference of the air passage 18. A second longitudinal connector 58 may define the radially innermost boundary of the noise attenuation structure 10, and a third longitudinal connector 60 may define the radially outermost boundary of the noise attenuation structure. Both the second and third longitudinal connectors 58, 60 may be concentric with the imaginary circumference of the air passage 18.

Each of the fourth and fifth through-holes 30, 32 may have similar elongated oval shapes bent along the second imaginary circumference $C_2$. Referring to FIGS. 2 and 4, each of the through-holes may have a top wall 62, a bottom wall 64, a first side wall 66, and a second side wall 68. All of the walls may be generally parallel and aligned with the direction of air-flow A. The fourth and fifth through-holes 30, 32 may each have a cross-sectional area that is uniform, or constant, from an entrance 70 to an exit 72. In cross-section as shown in FIG. 4, the top and bottom walls 62, 64 may be parallel with respect to each other and may be nonparallel with respect to the top and bottom walls 42, 44 of the first, second, and third through-holes 24, 26, 28. The top and bottom walls 62, 64 may also be parallel with the adjacent cross-sectional surface of the upper portion 22. When manufactured by a molding process, the top, bottom, first side, and second side walls 62, 64, 66, 68 may be slightly slanted toward each other from the entrance 70 to the exit 72, to provide a suitable amount of draft for removing the part out of a molding die.

Still other embodiments of the noise attenuation structure 10 are possible. For instance, the noise attenuation structure 10 may not necessarily have the exact number of through-holes as shown, and instead may have more or less through-holes. As one example, a first and second through-hole may lie along a first imaginary circumference $C_1$, while a third through-hole may lie along the second imaginary circumference $C_2$. Moreover, four through-holes may lie along the first imaginary circumference $C_1$, while three through-holes may lie along the second imaginary circumference $C_2$.

In another embodiment, a plate having a bore formed therethrough may be bolted between the intake manifold 12 and the throttle body 13. The noise attenuation structure 10 may extend from a bore wall of the plate. In yet another embodiment, the noise attenuation structure 10 may extend from a tab bolted to or between the intake manifold 12 and the throttle body 13, or the tab may be frictionally received or locked to the intake manifold and/or the throttle body. And in another embodiment, the noise attenuation structure 10 may extend from a ring or partial ring structure received in the intake manifold 12 and/or the throttle body 13.

In use, the noise attenuation structure 10 suppresses acoustic noise caused by the air-flow in the intake manifold 12. For example, referring to FIG. 4, as the throttle valve 14 begins to open, air-flow rushes through the air passage 18 and through the noise attenuation structure 10. Air-flow may travel through all of the first, second, third, fourth, and fifth through-holes 24, 26, 28, 30, 32, and the noise attenuation structure 10 may slightly slow the velocity of air-flow upon the opening of the throttle valve 14. The air-flow that funnels through the first, second, and third through-holes 24, 26, 28 may be directed away from the upper portion 22 upon exiting the through-holes. Furthermore, one theory suggests that the noise attenuation structure 10 may reduce turbulence in the air-flow, thus reducing noise, while another theory suggests that the noise attenuation structure may cause turbulence in the air-flow, thus reducing noise. The noise attenuation structure 10 may perform one or more of the above functions to reduce noise, or may perform one or more different functions not mentioned to reduce noise.

The above description of embodiments of the invention is merely exemplary in nature and, thus, variations thereof are not to be regarded as a departure from the spirit and scope of the invention.

What is claimed is:

1. A product comprising:
   a component of an internal combustion engine having an air passage; and
   a structure partially extending into the air passage, the structure having at least a first and a second through-hole, each of the first and second through-holes defining a cross-sectional area being tapered in a direction of air-flow through the air passage so that a cross-sectional area of an entrance of the through-hole is greater than a cross-sectional area of an exit of the through-hole, wherein the structure intersects a part of the total air-flow and attenuates acoustic noise in the component caused by the air-flow.

2. A product as set forth in claim 1 wherein the structure is located in an intake manifold near an air inlet of the intake manifold.

3. A product as set forth in claim 1 wherein the structure is adapted to be located in an intake manifold and downstream an air inlet of the intake manifold and near an inlet of a combustion chamber.

4. A product as set forth in claim 1 wherein the structure extends radially from an upper portion of an air passage wall of the component into the air passage.

5. A product as set forth in claim 1 wherein the structure spans about one-third of the total circumference of a cross-section of the air passage.

6. A product as set forth in claim 1 wherein air-flow through the first and second through-holes and exiting the through-holes is directed away from an air passage wall of the component.

7. A product as set forth in claim 1 wherein each of the first and second through-holes continuously tapers in cross-sectional area in the direction of air-flow from the entrance to the exit.

8. A product as set forth in claim 1 wherein each of the first and second through-holes has a generally elongated oval shape with a top wall and a bottom wall, the top and bottom walls respectively defining imaginary lines converging at a point located downstream the exit when the lines are extended.

9. A product as set forth in claim 1 further comprising a third through-hole defining a cross-sectional area being tapered in the direction of air-flow so that a cross-sectional area of an entrance of the third through-hole is greater than a cross-sectional area of an exit of the third through-hole, wherein the first, second, and third through-holes lie along a part of an imaginary circumference and are separated from one another by a first lateral connector and a second lateral connector.

10. A product as set forth in claim 9 wherein the first and second lateral connectors lie along a respective first imaginary radial line and a second imaginary radial line, the first and second imaginary radial lines converging at a centerpoint of the air passage.

11. A product as set forth in claim 9 further comprising a fourth and a fifth through-hole, each of the fourth and fifth through-holes defining a cross-sectional area being uniform from an entrance of the through-hole to an exit of the through-hole, wherein the fourth and fifth through-holes lie along a part of a second imaginary circumference being radially offset from the first imaginary circumference so that the fourth and fifth through-holes are separated from the first, second, and third through-holes by a longitudinal connector.

12. A product as set forth in claim 11 wherein each of the fourth and fifth through-holes has a generally elongated oval shape with a top wall, a bottom wall, a first side wall, and a second side wall, the top, bottom, first side, and second side walls being generally parallel with the direction of air-flow.

13. A product comprising:
a structure used in an internal combustion engine to attenuate acoustic noise caused by air-flow downstream a throttle valve, the structure comprising:
a first through-hole lying along a part of a first imaginary circumference and having a first top wall and a first bottom wall, the first top wall being slanted toward the first bottom wall from an entrance of the first through-hole to an exit of the first through-hole, and the first bottom wall being slanted toward the first top wall from the entrance to the exit;
a second through-hole lying along a part of the first imaginary circumference, being circumferentially offset from the first through-hole, and being separated from the first through-hole by a lateral connector, the second through-hole having a second top wall and a second bottom wall, the second top wall being slanted toward the second bottom wall from an entrance of the second through-hole to an exit of the second through-hole, and the second bottom wall being slanted toward the second top wall from the entrance to the exit; and
a third through-hole lying along a part of a second imaginary circumference being radially offset from the first imaginary circumference, the third through-hole being separated from the first and second through-holes by a longitudinal connector and having a third top wall and a third bottom wall each being generally parallel with a direction of air-flow.

14. A product as set forth in claim 13 wherein each of the first and second through-holes define a cross-sectional area being tapered in the direction of air-flow so that a cross-sectional area of the entrance is greater than a cross-sectional area of the exit.

15. A product as set forth in claim 14 wherein the third through-hole defines a cross-sectional area being uniform from an entrance of the third through-hole to an exit of the third through-hole.

16. A product as set forth in claim 15 wherein the lateral connector lies along an imaginary radial line going through a centerpoint of the air passage when the radial line is extended.

17. A product comprising:
an intake manifold having an air passage defined by an air passage wall; and
a structure extending from a portion of the air passage wall into the air passage and intersecting a part of a total air-flow through the air passage, the structure attenuating acoustic noise in the intake manifold caused by the air-flow and comprising:
a first through-hole lying along a part of a first imaginary circumference and defining a cross-sectional area being tapered from an entrance of the first through-hole to an exit of the first through-hole;
a second through-hole lying along a part of the first imaginary circumference, being circumferentially offset from the first through-hole, and defining a cross-sectional area being tapered from an entrance of the second through-hole to an exit of the second through-hole;
a third through-hole lying along a part of the first imaginary circumference, being circumferentially offset from the second through-hole, and defining a cross-sectional area being tapered from an entrance of the third through-hole to an exit of the third through-hole;
a fourth through-hole lying along a part of a second imaginary circumference being radially offset from the first imaginary circumference, the fourth through-hole defining a cross-sectional area being uniform from an entrance of the fourth through-hole to an exit of the fourth through-hole; and
a fifth through-hole lying along a part of the second imaginary circumference, being circumferentially offset from the fourth through-hole, and defining a cross-sectional area being uniform from an entrance of the fifth through-hole to an exit of the fifth through-hole.

18. A product as set forth in claim 17 further comprising:
a first lateral connector separating the first and second through-holes, the first lateral connector lying along a first imaginary radial line going through a centerpoint of the air passage;
a second lateral connector separating the second and third through-holes, the second lateral connector lying along a second imaginary radial line going through the centerpoint;
a third lateral connector separating the fourth and fifth through-holes, the third lateral connector lying along a third imaginary radial line going through the centerpoint; and
a longitudinal connector separating the first, second, and third through-holes from the fourth and fifth through-holes, the longitudinal connector being concentric with the first and second imaginary circumferences.

19. A method comprising:
providing a component of an internal combustion engine having an air passage defined by an air passage wall;

providing a structure extending from the air passage wall, the structure having at least a first and a second arcuate shaped through-hole, each of the first and second through-holes having a tapered cross-section; and funneling air-flow through the first and second through-holes to attenuate noise in the component caused by the air-flow.

20. A product comprising:

an intake manifold having an air passage defined by an air passage wall; and a structure extending into the air passage and having at least one arcuate shaped slot lying along an imaginary circumference, the structure attenuating acoustic noise in the intake manifold caused by air-flow.

21. A product as set forth in claim 20 further comprising a second arcuate shaped slot lying along the imaginary circumference or lying along a second imaginary circumference being radially offset from the imaginary circumference.

* * * * *